US012215005B2

(12) United States Patent
Paßmann et al.

(10) Patent No.: US 12,215,005 B2
(45) Date of Patent: Feb. 4, 2025

(54) SUPPORT FOR A TROLLEY, AND OVERHEAD TRANSPORT DEVICE HAVING SUCH A SUPPORT

(71) Applicant: Konecranes Global Corporation, Hyvinkaa (FI)

(72) Inventors: Christoph Paßmann, Dortmund (DE); Bastian Wiehagen, Hagen (DE); Marian Witte, Dortmund (DE); Sven Müller, Breckerfeld (DE)

(73) Assignee: Konecranes Global Corporation, Hyvinkää (FI)

( * ) Notice: Subject to any disclaimer, the term of this patent is extended or adjusted under 35 U.S.C. 154(b) by 304 days.

(21) Appl. No.: 17/754,344

(22) PCT Filed: Sep. 25, 2020

(86) PCT No.: PCT/EP2020/076847
§ 371 (c)(1),
(2) Date: Mar. 30, 2022

(87) PCT Pub. No.: WO2021/063810
PCT Pub. Date: Apr. 8, 2021

(65) Prior Publication Data

US 2022/0332547 A1 Oct. 20, 2022

(30) Foreign Application Priority Data

Sep. 30, 2019 (DE) ..................... 10 2019 126 399.9

(51) Int. Cl.
*B66C 17/00* (2006.01)
*B61B 3/00* (2006.01)
*B66C 7/02* (2006.01)

(52) U.S. Cl.
CPC ................. *B66C 7/02* (2013.01); *B61B 3/00* (2013.01); *B66C 17/00* (2013.01)

(58) Field of Classification Search
CPC ........... B66C 6/00; B66C 17/00; B66C 19/00; B61B 3/00
See application file for complete search history.

(56) References Cited

U.S. PATENT DOCUMENTS 2,024,001 A 12/1935 Hamilton
2,366,574 A * 1/1945 Taylor .................... B66C 17/00 212/262

(Continued)

FOREIGN PATENT DOCUMENTS

DE 102015101755 A1 8/2016
JP S5415980 U 2/1979

(Continued)

OTHER PUBLICATIONS

Preliminary Report on Patentability of the International Searching Authority in English from corresponding Patent Cooperation Treaty (PCT) Application No. PCT/EP2020/076847, issued Dec. 21, 2021.

*Primary Examiner* — Michael R Mansen
*Assistant Examiner* — Juan J Campos, Jr.
(74) *Attorney, Agent, or Firm* — Gardner, Linn, Burkhart & Ondersma LLP

(57) ABSTRACT

A support for a trolley, having a running surface that is formed on the support for the trolley, an upper chord, a lower chord and braces that connect said chords together, wherein the braces are designed to be flat, and each brace has a main surface that faces away from the support longitudinally between the upper chord and the lower chord. Two of the braces form a brace pair in each case and are arranged next to one another as viewed in the direction of the longitudinal axis of the support, preferably on the outside of opposite longitudinal sides of the support. To provide such a support, the flat braces are releasably secured to the upper chord and/or to the lower chord. The invention also relates to an (Continued)

overhead transport device having such a support and a trolley that can be moved along the support on the running surface.

16 Claims, 7 Drawing Sheets

(56) References Cited

U.S. PATENT DOCUMENTS 3,152,671 A * 10/1964 Mallory, Jr. .............. E01D 6/00 52/693
3,294,252 A * 12/1966 Hosoi ....................... B66C 6/00 212/346
3,416,283 A * 12/1968 Sanford .............. F16B 15/0046 52/693
4,078,352 A * 3/1978 Knowles ................. E04C 3/292 52/696
4,102,108 A * 7/1978 Cody ........................ E04B 1/24 52/693
4,348,850 A * 9/1982 Reeder ...................... E04B 1/49 52/696
4,475,328 A * 10/1984 Reeder ...................... E04B 1/49 52/693
4,485,606 A * 12/1984 Gottlieb .................. E04C 3/292 52/696
4,541,218 A * 9/1985 Gottlieb .................. E04C 3/292 52/696
4,621,475 A * 11/1986 McClain ................... E04C 3/09 52/693
4,665,677 A * 5/1987 Palacio ................... E04C 3/292 52/693
11,078,053 B2 * 8/2021 Golder ...................... B66C 7/02
2006/0283129 A1 * 12/2006 Salhaney .................. E04C 3/11 52/633
2017/0144867 A1 * 5/2017 Paßmann .................. F16B 7/18

FOREIGN PATENT DOCUMENTS

JP S6222529 U 2/1987
NL 278615 A 7/1964
WO 2015177292 A1 11/2015

* cited by examiner

SUPPORT FOR A TROLLEY, AND OVERHEAD TRANSPORT DEVICE HAVING SUCH A SUPPORT

BACKGROUND AND FIELD OF THE INVENTION

The invention relates to a support for a trolley and to an overhead transport device having such a support.

A crane girder designed as a box girder, on the longitudinal box girder walls of which flat braces are formed between the upper chord and the lower chord, is known from VETTER Krantechnik GmbH. The braces are produced in that triangular openings are introduced into the respective box girder wall and are spaced apart from one another in the longitudinal direction of the girder. As a result, a diagonal portion of the box girder wall, which forms one of the braces in each case, remains in each case between two adjacent triangular openings. This corresponds to the features of the preamble of claim 1. A profile rail as a support for a trolley is arranged below the lower chord.

WO 2015/177292 A1 also discloses a crane girder, which is designed as a truss girder having an upper chord, a lower chord and braces that connect said chords together. The braces are designed to be flat, and each brace has a main surface extending transversely to a longitudinal axis of the crane girder. In addition, the struts are arranged one behind the other as viewed in the direction of the longitudinal axis and are releasably secured to the upper chord and the lower chord. A further crane girder with comparably arranged flat braces is known from DE 10 2015 101 755 A1.

Further truss girders with rod-shaped or tubular braces are known from JP S54 15980 U, JP S62 22529 U, U.S. Pat. No. 4,102,108 A, NL 278 615 A and U.S. Pat. No. 2,024,001 A.

SUMMARY OF THE INVENTION

The object of the invention is to provide an improved generic support and an overhead transport device which are in each case particularly economical to produce.

This object is achieved by a support and a transport device having the features of the claims. Advantageous embodiments of the invention are given in the claims and the following description.

According to the invention, a generic support for a trolley, having a running surface formed on the support for the trolley or its wheels which are supported by a trolley running gear, an upper chord, a lower chord and braces that connect said chords together, wherein the braces are designed to be flat, and each brace has a main surface that faces away from the support longitudinally between the upper chord and the lower chord, wherein two of the braces form a brace pair in each case and are arranged next to one another as viewed in the direction of the longitudinal axis of the support, preferably on the outside of opposite longitudinal sides of the support, is particularly economical to produce in that the flat braces are releasably secured to the upper chord and/or to the lower chord.

In other words, the flat braces are releasably connected to the upper chord and/or lower chord, wherein the upper chord and/or lower chord preferably extend in parallel to one another and in particular horizontally. For this purpose, each brace has at least two securing ends, one of which is secured to the upper chord and one of which is secured to the lower chord in each case. For releasable securing, a screw connection is preferably provided between the respective brace and the upper chord or lower chord, wherein each screw connection can also have more than one screw. Depending on the design of the brace, two or more screws at the respective securing end are thus also conceivable. For example, in the case of braces with only two securing ends, and in the case of four-arm braces, which are described in more detail below, with four securing ends, two screws can be provided in each case, and in the case of the two-arm braces, which are described in more detail below, with three securing ends, four screws can be provided in each case.

As a result of the releasable securing of the flat brace(s), a modular design of the support is advantageously achieved, since the chords and braces along with the connecting elements for producing the releasable securing can be prefabricated as individual components of the support and can be transported in a space-saving manner prior to assembly and thus in a simple and cost-effective manner to the place of use, for example in a standardized or normalized cargo container. The entire assembly of the support can thus be shifted to the place of use. In comparison to supports with conventional, non-releasable connections between the braces and the respective chord, a particularly simple assembly of the support at the place of use is thus possible, and comparatively expensive manufacture at a factory and complicated transport can be avoided. In this context, both weld connections that are complex to produce and the clean cutting of braces from an initially closed box girder wall can be avoided. The following aspects also increase the economic viability in the production of the generic support in a particularly advantageous manner.

By using a different number of corresponding braces, the length of the support can be particularly flexibly adapted to the respective application and the span required for this purpose, in that only the chords are correspondingly cut to length and the braces are releasably secured at the desired longitudinal position. This applies both to the initial assembly and to a subsequent adaptation in the case of changed requirements. In this case, the upper chord or lower chord of the support can also be multi-part, so that the desired total length is produced by connecting a plurality of chord segments, wherein the individual chord segments can have standardized lengths. Both the same and different distances between the braces along the longitudinal axis of the support are possible.

Such a support is preferably used in combination with a trolley in order to thereby produce an overhead transport device described in more detail below. Such a transport device makes it possible, in particular, to transport loads suspended on the trolley in a trolley travel direction, which is defined by the running surface that extends in the longitudinal direction of the support.

In the present case, in particular the elements of the support designed as a truss girder that have a profile that is oblique or diagonal between the upper chord and the lower chord in relation to the longitudinal axis of the support are regarded as braces. In the case of the multi-arm braces described in more detail below, the elements of the support whose arms have a profile that is oblique or diagonal between the upper chord and the lower chord in relation to the longitudinal axis of the support are regarded as braces. As a result, the braces differ from elements that extend exclusively vertically and are referred to as posts in the context of truss girder structures.

By means of a corresponding flat design, the braces or surface braces preferably absorb forces in the direction of their longitudinal axis and thus in the extension plane of their preferably planar main surface. Such surface elements or surface support structures are referred to as panes in engineering mechanics, whereas surface elements loaded perpendicularly to their extension plane or main surface are referred to as plates. Panes and thus also the surface braces according to the invention differ, for example, from rods or rod-shaped posts and braces in that their thickness dimensions are substantially smaller than the length and width dimensions defining the planar extension of the pane. In particular, the main surface of the planar brace has significantly larger dimensions than its material thickness. Accordingly, flat braces can also be referred to as surface braces or pane braces.

In other words, the term "main surface" in the present document refers to the area portion or surface portion of the respective brace, the normal vectors of which point away from the support longitudinally. In this case, the extension of the main surface facing away from the support longitudinally is very much larger in particular with regard to its length and width than in the depth measured transversely to the longitudinal axis of the support and than the dimensions, measured transversely to the longitudinal axis of the support, of possible secondary surfaces, which are described in more detail below, on the longitudinal sides of the brace.

The main surface of the respective brace extends, preferably completely, outside the longitudinal axis of the support and at least partially or completely in parallel to the longitudinal axis of the support. The main surface thus has an outer-wall-like orientation in each case. In this case, the main surface can face away from the longitudinal axis longitudinally at right angles and completely horizontally, as is the case in the at least partially chamfer-free variant described below and in the variant having at least one secondary surface adjoining the main surface. In the variant that is likewise described in more detail below and has a bead, the main surface thereof, deviating in the region of the depression of the main surface forming the bead, can also face away from the longitudinal axis longitudinally at an angle, in particular with portions of different inclinations.

In the case of a support installed in an overhead transport device, in particular a suspension track or a suspension crane, the main surfaces facing away from the support longitudinally are each oriented such that they face away longitudinally transversely to the longitudinal axis of the running surface formed on the support for the trolley. In this case, the main surface can be assigned to one of the two longitudinal sides between the upper chord and the lower chord and can extend at right angles with respect to the running surface formed on the support and/or to any crane track or to the traveling plane of the trolley defined thereby and/or to any crane running gears. In the case of a support installed in the above sense, this corresponds to a vertical extension of the main surface. Regions of the optional beads may deviate from the rectangular or vertical extension.

A plurality of braces are preferably designed identically and are releasably secured to the upper chord and/or lower chord. It is also possible for all braces to be identical or for all embodiments described below or also only a selection thereof to be installed on the same support. A combination of different embodiments can be necessary, for example, in order to ensure the removal of the forces occurring during operation in all regions of the support, irrespective of their distance from a crane running gear, in an overhead transport device.

The upper chord, apart from its length, is preferably identical, in particular with regard to its cross-section, for all variants of the braces and thus of the support. This also applies to the lower chord. However, it is also conceivable to use different upper chords or lower chords, in particular with different cross-sections. The lengths of upper chord and lower chord may also differ from one another. In this case, the lower chord can be longer than the upper chord and in particular also longer than the longitudinal extension of the bracing formed by the braces, so that the lower chord can project in the direction of its longitudinal ends on both sides beyond the bracing and the upper chord. The optional crane running gears, which are described in more detail below, can be arranged on and secured to the longitudinal ends that are thus free of upper chord and of bracing. The support can thus be adapted in a simple manner to different intended uses, in particular required span widths and desired load-bearing regions, by using different braces with the same upper chord cross-section and/or lower chord cross-section.

The modular design described above advantageously enables economies of scale in the production of the support. The braces can be produced from an aluminum or steel material or from a composite material. The braces can also be produced by means of punching, laser cutting, forming or as cast parts. The upper chord and/or lower chord can also be produced from an aluminum material. By using aluminum material and/or composite material, the support can be produced as a lightweight support, which further increases the weight savings already achieved by its truss design.

In a structurally simple manner, provision can be made for a receiving groove having a c-shaped cross-section to be provided on the upper chord and/or lower chord, preferably on the outside of a longitudinal side of the respective chord, in order to be able to receive therein an element for producing the releasable securing of the braces, preferably at least one such element per securing end. Depending on the design of the braces, two or more such elements can also be provided for producing the releasable securing at the respective securing end. For example, in the case of braces with only two securing ends and in the case of four-arm braces with four securing ends, which are described in more detail below, two elements each are conceivable, and in the case of the two-arm braces with three securing ends, which are described in more detail below, four elements each are conceivable.

In the case of a screw connection, the element received by the receiving groove in the manner of a sliding block can, for example, be a nut or a screw head. In this case, two arms delimiting the opening of the receiving groove form an undercut, through which the element introduced from a longitudinal end of the respective chord for producing the releasable securing of the brace within the receiving groove can be supported on the respective chord or the associated arms. As a result of the c-shaped receiving groove, no bores in the chord are required for the releasable securing of the brace to the respective chord. In particular, a definition of the securing position, in particular the screwing position, is thereby freely selectable. The effort for defining the securing position in advance, for example by generating a drill pattern in the respective chord, can be omitted. Instead, the securing position for the braces at the desired longitudinal position can be freely selected as a result of the receiving groove, which is in particular designed as a longitudinal groove. Such a receiving groove or longitudinal groove having a c-shaped cross-section is preferably provided on two opposite longitudinal sides of the upper chord and/or lower chord. In the case of a support with such an upper chord and lower chord, the receiving grooves are thus arranged one above the other in each case on the longitudinal side of the support in the direction of extension of the braces, and the longitudinal grooves of the upper chord or of the lower chord are each open in the horizontal direction and are preferably mirror-symmetrical and in particular at the same height.

The upper chord can be designed as a conventional construction profile, in particular in the form of a double groove profile with two c-shaped (in the above sense) and longitudinally opposite receiving grooves and can be produced as such, for example from an aluminum material by means of an extrusion process. Production from a steel material is also possible.

It is furthermore provided that two of the braces in each case form a brace pair and are arranged next to one another as viewed in the direction of the longitudinal axis of the support, preferably on the outside of opposite longitudinal sides of the support. A plurality of brace pairs are preferably arranged along the longitudinal axis. The main surfaces of the two braces of the respective brace pair face away from the support longitudinally, i.e., from the respective one of the opposite longitudinal sides, in particular in opposite directions. In this case, it can be provided that the braces rest on the outside of the respective longitudinal side of the upper chord and/or lower chord. The braces thus arranged in pairs are preferably arranged symmetrically on the opposite longitudinal sides with respect to the longitudinal axis of the support, wherein the braces of one longitudinal side can extend, in particular with their main surfaces, in parallel to the braces of the other longitudinal side, in particular their main surfaces. The orientation of the main surfaces is thus preferably the same on each longitudinal side.

The braces of the respective brace pair are preferably mounted with the same orientation, i.e., they then have the same inclination with respect to the longitudinal axis of the support. The inclination can, as viewed in the direction of the longitudinal axis, thus rise either from the lower chord in the direction of the upper chord or fall from the upper chord in the direction of the lower chord. Braces with an increasing inclination and braces with a falling inclination preferably alternate in the longitudinal direction of the support, wherein the braces located at the longitudinal ends of the bracing and thus pointing toward the longitudinal ends of the support are preferably inclined in the direction of the respective longitudinal end, falling from the upper chord to the lower chord. This results in a bracing in the form of inverted "Vs" arranged in a row on each longitudinal side. Along the longitudinal axis of the support, the bracings in the form of a single, inverted "V" can directly abut with their securing ends against one another on the respective longitudinal side on the lower chord or can be spaced apart from one another, preferably uniformly, which results from the respective application requirements. This also applies to distances of adjacent braces or their securing ends on the upper chord.

In one possible design of the braces of the support, it can be provided that at least one of the braces is designed to be chamfer-free at least on its longitudinal sides. In this context, the term "chamfer-free" means that the edges of the respective brace extend at least on the longitudinal sides, in particular in their free region extending outside the upper chord and lower chord, exclusively in a plane spanned by the respective main surface. It is also possible for the entire brace to be completely chamfer-free in this sense, i.e., to extend exclusively in the plane spanned by the main surface, without the edge thereof being chamfered with respect to the main surface or the plane spanned thereby. In other words, the entire brace is formed by the planar main surface. Such a chamfer-free design advantageously enables a particularly simple production of the brace in terms of manufacturing technology as a flat part with the desired brace contour, for example by punching or laser cutting. The edges on the longitudinal sides of such chamfer-free braces can also have a profile between their securing ends that is narrowed on both sides and preferably biconcave, and the brace thus initially tapers along its longitudinal extension relative to its main surface and subsequently widens again. This also applies to the arms of the two-arm braces described in more detail below. A design of the braces that is chamfer-free in this sense does not exclude the provision of a bead, which is described in more detail below, in the main surface.

Alternatively or additionally, it can optionally be provided that at least one of the braces on at least one of its longitudinal sides, in particular in its free region of the brace between the upper chord and the lower chord, has a secondary surface adjoining the main surface and extending transversely thereto. The respective secondary surface brings about an increase in the stiffness, in particular buckling stiffness, of the brace. In order to form the secondary surface(s), the respective longitudinal side or the edge of the brace there is preferably bent, preferably chamfered, in relation to the main surface. The secondary surface(s) are thus each arranged between the main surface and the edge delimiting the respective longitudinal side. Depending on whether secondary surfaces are formed only one longitudinal side or on both longitudinal sides and in this case in the same direction or opposite directions, the respective brace has an L-shaped, U-shaped or Z-shaped cross-section at least in the free region between and outside the upper chord and lower chord. In the case of a U-shaped or L-shaped cross-section, the respective secondary surface preferably extends in the direction of the longitudinal axis, i.e., inward. In the case of a Z-shaped cross-section, one secondary surface extends inward and one secondary surface extends outward. If the brace has one or two secondary surface(s), the main surface of the brace, which is in this way delimited longitudinally in each case, is delimited in a straight line, for example by a correspondingly straight bending line or chamfer between the secondary surface and the associated longitudinal edge. If only one secondary surface is provided, the associated boundary of the main surface preferably runs in parallel to the chamfer-free other longitudinal edge.

Alternatively or additionally, it can optionally likewise be provided that the main surface of at least one of the braces has a bead. The respective bead brings about an increase in the stiffness, in particular buckling stiffness, of the brace. In this case, the bead formed as a depression in the main surface is preferably arranged in each case between the longitudinal sides of the brace such that a portion of the main surface, which is preferably planar and extends in parallel to the longitudinal axis of the support, is located between the bead and the two edges delimiting the longitudinal sides. If the brace has a bead, the edges of the brace are preferably chamfer-free on their longitudinal sides and extend between their securing ends preferably in parallel to one another and in this case preferably in a straight line. The longitudinal extension of the bead preferably extends in parallel thereto and in particular in a centered manner with respect to the central longitudinal axis of the main surface of the respective brace. The depression of the main surface provided for forming the bead is preferably directed outward, i.e., away from the longitudinal axis of the support.

According to a further possible embodiment of the braces of the support, it can alternatively or additionally also be provided that at least one of the braces is designed to be multi-arm, preferably two-arm or four-arm. In this case, the main surface and its edges are preferably similarly designed and oriented on each arm of the corresponding brace.

With each of their arms, the multi-arm braces form a securing end of the brace, with which the brace is secured to the respective chord. Multi-arm braces thus have at least three securing ends, whereas the one-arm braces, which are alternative thereto, have only two securing ends in the form of their longitudinal ends.

The multi-arm brace or the arrangement of the associated arms is preferably mirror-symmetrical. The brace is preferably also formed in one piece and in particular without a welded connection between the arms and can therefore be produced in a simple manner as described above.

In the case of the two-arm brace, the two arms converge in a connection region of the brace on the upper chord, wherein the connection region simultaneously serves as one of a total of three securing ends of the two-arm brace. Accordingly, the arms or the securing ends thereof arranged on the lower chord are spaced apart from one another in the longitudinal direction of the support. This results in a bracing in the form of an inverted "V" on the respective longitudinal side of the support similarly to the above-described arrangement of braces with only two securing ends. While two separate braces are required for such an arrangement for each inverted "V" in the above example, a single two-arm brace can be used for a bracing of a comparable shape.

In the case of the four-arm brace, an x-shaped or H-shaped design of the brace is preferred, which thus results in an x-shaped or H-shaped bracing on the respective longitudinal side of the support. In this case, the four arms of the brace likewise converge in a connection region that, however, is arranged not on the upper chord but outside thereof in a free region of the brace between the upper chord and the lower chord. Due to the x-shaped or H-shaped form, the four-arm braces each have four securing ends, of which two are spaced apart from one another in the longitudinal direction of the support and secured to the upper chord and two are spaced apart from one another in the longitudinal direction of the support and secured to the lower chord in each case.

The above statements relating to the brace pairs formed by two braces each with only two securing ends each and to the inclinations of these braces in relation to the longitudinal axis apply in the same way to the arms of the multi-arm braces and the securing ends formed thereby. In the case of a two-arm brace, an arm with a falling inclination thus preferably follows an arm with increasing inclination when viewed in the longitudinal direction of the support. The multi-arm braces can directly abut against one another or can be spaced apart from one another along the longitudinal direction of the support, which results from the respective application requirements. It can also be provided that at least one brace pair of multi-arm braces and therebetween braces with only two securing ends, in each case one for the upper chord and one for the lower chord, are in each case arranged on the opposite longitudinal ends of the bracing of the support. This applies irrespective of whether the braces are chamfer-free or have secondary surfaces or beads for increasing the buckling stiffness. Optionally, a four-arm brace or a brace pair thereof can also be provided, for example at half the length of the support for marking the longitudinal center of the support. A plurality of or exclusively multi-arm, in particular two-arm or four-arm, braces can also be installed, in particular as brace pairs in the above sense, on a support.

On a support according to the invention, chamfer-free braces and braces with secondary surfaces can thus be combined as braces with a main surface facing away from the support longitudinally and can each be formed with or without a bead. These variants can also be formed with only two securing ends or as a multi-arm brace.

As a further option, at least one friction-increasing contact surface can be provided on the support according to the invention between at least one of the braces and the upper chord and/or between at least one of the braces and the lower chord.

The friction-increasing contact surface brings about a friction-increasing positive micro-connection between the components to be connected, i.e., the respective brace and the respective chord, as a result of its surface structure introduced there. For this purpose, the surface structure of the friction-increasing contact surface differs from the surface structure of the respective component outside the contact surface. The friction-increasing contact surface has the function of increasing the friction coefficient between the connected components acting within the connection produced for releasable securing, in order to thereby enable a higher force transmission in the case of otherwise unchanged connecting elements, i.e., for example, the screw connection.

For this purpose, a separate element can be introduced for increasing the friction coefficient, with which element a friction-increasing contact surface is formed on opposite sides in each case, of which in each case one contact surface then rests within the connection against one of the two components to be connected and brings about a friction-increasing positive micro-connection there as a result of its friction-increasing surface structure. For this purpose, the surface structure of the friction-increasing contact surfaces differs from the surface structure of the respectively contacted component.

The element for increasing the friction coefficient can in particular be part of the releasable securing between the brace and the respective chord and, in the case of a screw connection, can be part thereof, for example within the receiving groove described above, or outside thereof on the arms of the respective chord that delimit the receiving groove. As a result, the increase in the friction coefficient can be easily achieved flexibly at the desired position, without having to change the brace or the surface structure of the chord itself.

The friction-increasing element can be designed, for example, as a plate, a pane or a non-woven fabric with a surface that is different from the brace or the chord, and thus friction-increasing, for example rippled. The element can also be used in connection with the butt joint of successive chord segments, in particular profile rails used for this purpose. If the releasable securing between the brace and the upper chord and/or lower chord comprises a screw connection, the element can be integrated into this screw connection and can be screwed together with the aforementioned components, for which purpose it then has at least one hole for the passage of the screw(s) of the respective screw connection.

In a preferred embodiment of the support, it can be provided that the running surface is arranged in an interior space enclosed by the lower chord, in order to be able to receive an internally running trolley running gear and the associated wheels of the trolley, for which purpose the lower chord preferably has a c-shaped cross-section and the running surface is arranged on the arms thereof delimiting an opening of the interior space.

The running surface can be formed by the arms themselves that delimit the opening of the interior space. In the installation position of the support in an overhead transport direction according to this application, the opening points downward. The arms and thus also the running surface and the traveling plane of the trolley defined thereby extend preferably horizontally in the installation position.

The trolley projects, starting from its internally running trolley running gear, through the opening out of the lower chord or the interior space enclosed thereby. As a result, the trolley can be connected to the load that is arranged outside the lower chord and is to be transported, with or without the interposition of a hoist. Since the opening extends, due to the c-shaped cross-section, in the shape of a gap in parallel to the longitudinal axis of the support, the trolley can be moved along the opening on the running surface and thus in the trolley travel direction by means of its internally running trolley running gear and the wheels thereof arranged in the interior space.

The lower chord of the support according to the invention is preferably designed as a profile rail with a corresponding c-shaped cross-section and an interior space delimited thereby for receiving the internally running trolley running gear. Insofar as such a profile rail with a c-shaped cross-section has only been used as a support for a trolley so far, such a profile rail now advantageously becomes a part of a support for a trolley, which support is designed overall as a truss girder. In other words, in the case of such a truss girder, the upper chord and the bracing formed by the braces form a truss-like reinforcing structure for the profile rail, which now serves as lower chord, is conventional per se, has a c-shaped cross-section and can also be used on its own as a support for a trolley. Being able to use an already existing conventional profile rail, in particular a profile rail for a trolley, for the support according to the invention is advantageous, since this profile rail can now be used for larger span widths and larger load-bearing regions as a result of the truss-like reinforcing structure produced according to the invention. This applies in particular to profile rails produced from an aluminum material.

The advantages of the support according to the invention are particularly effective when an overhead transport device for loads is provided with such a support and a trolley that can be moved along the support on the running surface. The transport device is preferably designed as a suspension track or as a crane, preferably a suspension crane.

With such overhead transport devices, the support together with the trolley arranged thereon is suspended on a steel structure or a superstructure, such as roof trusses or ceilings. Such overhead transport devices thus differ, for example, from ground-bound and rail-bound movable gantry cranes or bridge cranes, with which the crane girder and the crane track are mounted on pillars in relation to the ground.

In the case of a suspension track, the overhead transport device serves for the linear transport of loads suspended on the trolley, in the trolley travel direction. A hoist that is uniformly moved with the trolley, for example a chain hoist or a wire rope hoist, by means of which the loads can be raised and lowered, can also be secured to the trolley of the suspension track.

In order to not only enable linear overhead transports by moving the trolley in the trolley travel direction but also area-covering load transports, the transport device can also be designed as a crane. For this purpose, the support itself, together with the trolley carrying the hoist, can then also be moved transversely to its longitudinal axis along a crane track in a crane travel direction and be suspended thereon in the case of a suspension crane. As part of a crane, the support can be moved transversely, in particular at right angles, to its longitudinal axis defining the trolley travel direction, along a crane track that defines the crane travel direction and is likewise suspended in the case of a suspension crane.

In order to be able to move the support in the crane travel direction, a crane running gear with associated wheels is arranged in each case in the region of its opposite longitudinal ends. The support is suspended on the crane track by means of the crane running gears. The two crane running gears, as well as the running gear of the trolley, are each preferably designed as an internally running gear. In order to form the running surfaces of the crane track to be provided for the respective crane running gears or the wheels thereof, two profile rails, which are spaced apart from one another and have a c-shaped cross-section, can be used, the arms of which profile rails are each used on their inner side as a running surface for the crane running gears and delimit an opening of the interior space of the profile rail. The crane running gears received in the interior space together with their wheels are in this case connected to the support through the opening, in order to thus suspend the support on the crane track. Due to the c-shaped cross-section, the opening of the respective crane-track profile rail also extends in the shape of a gap and in parallel to the longitudinal profile-rail axis or the crane travel direction.

In order to form the crane track and the lower chord of its support, the suspension crane can thus have a total of three identical profile rails, wherein the profile rails are at least identical to the extent that they all have a c-shaped cross-section for receiving the internally running trolley running gears or crane running gears and for forming the running surfaces for this purpose. With regard to the dimensions of the cross-section and their length, the profile rails can likewise be identical. The profile rails provided for forming the crane track can also each be provided in the form of a support according to the invention, with which the profile rail then in each case forms the lower chord of the support designed as a truss girder and is reinforced by the truss-like reinforcing structure.

Alternatively to a single-support variant, a two-support variant is likewise possible, with which two supports according to the invention are provided for the trolley. The trolley then has two or more, preferably four, trolley running gears, at least one of which, preferably an equal number of which, is assigned to each of the two supports. In this case, the two supports extend in parallel to one another and are spaced apart from one another. This also applies to the running surfaces of the crane track. A total of four profile rails identical in the above sense and a total of in particular four identical supports according to the invention having such a profile rail each can then be used as the lower chord in this case. Even cranes with even more identically designed profile rails or supports according to the invention are thus conceivable, for example if the crane track has to be formed by more than just two profile rails or supports in the case of large span widths and corresponding support lengths.

The trolley of these transport devices can be moved manually or by hand in the trolley travel direction and/or the crane travel direction. A wired control switch for controlling the lifting motor of the hoist is generally suspended on the trolley on a control line suspended from the hoist and is connected for this purpose to its controller via the control line in a signal-transmitting manner. The energy supply of at least the hoist can take place via an electrical contact line arranged in the interior space of the lower chord, for which the trolley has corresponding current collectors, or a trailing cable. However, motorized trolley running gears and crane running gears are also conceivable, which can then be controlled by an operator, for example via the control switch suspended on the control line. For this purpose, the energy supply can also take place, for example, by means of a contact line or a trailing cable. In addition, instead of a wired control switch, the use of a wireless control switch is also possible, with which a wireless signal-transmitting connection with the controller for the hoist or the respective running gear can then be produced accordingly, for example by radio. If, when a wireless control switch is used, no motorized running gears that are also controllable via the control switch are used, a corresponding force transmission element can be provided for manually moving in the trolley travel direction and/or crane travel direction, via which element corresponding drive forces can be applied by the operator, for example in the form of a wire rope, rod or chain connected to the trolley in a force-transmitting manner.

Some exemplary embodiments of the invention are explained in more detail with reference to the following description and associated schematic figures.

BRIEF DESCRIPTION OF THE DRAWINGS

FIG. 1 shows a perspective view of a crane 1 designed as a single-girder suspension crane with a support 2 according to the invention in a first exemplary embodiment. The support 2 designed as a truss girder comprises, as essential components, an upper chord 3, a lower chord 4 and braces 5 that connect said chords together. In this case, the lower chord 4 is longer than the upper chord 3 and in particular also longer than the longitudinal extension of the bracing formed by the braces 5. As a result, the lower chord 4, which determines the total length of the support 2, projects in the direction of its longitudinal ends beyond the bracing on both sides.

In order to form the crane 1 as a suspension crane, a trolley 6 is arranged on the support 2, carries a hoist 6*c* designed as a chain hoist by way of example, and can be moved by means of wheels 6*b* of its trolley running gear 6*a* on a running surface of the support 2 in a horizontal trolley travel direction X. The trolley travel direction X is defined by the running surface for the trolley 6, which running surface extends on the support 2 in the longitudinal direction thereof, that is, in parallel to the longitudinal axis thereof.

Figure 7:
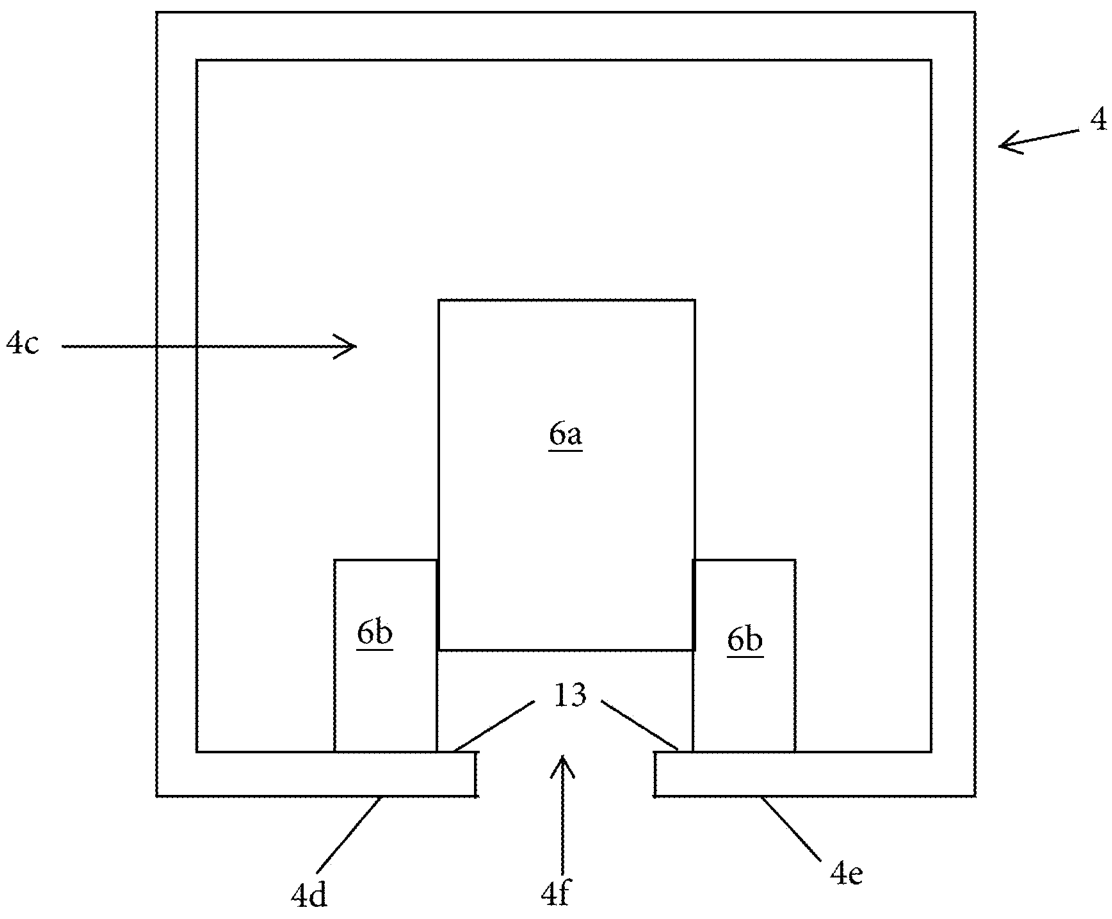
FIG. 7 is a cross-sectional view of the lower chord of the support of FIG. 1.

The running surface 13 for the trolley 6 is arranged in an interior space 4*c* that is enclosed by the lower chord 4 and in which the internally running trolley running gear 6*a* and the wheels 6*b* of the trolley 6 are received. For this purpose, the lower chord 4 in the present example has a c-shaped cross-section, the arms 4*d*, 4*e* of which delimit an opening 4*f* of the interior space 4*c* and on the arms 4*d*, 4*e* of which the running surface 13 is arranged, as shown in FIG. 7.

In order to form the crane 1 as a suspension crane, the support 2 is also suspended in the region of its longitudinal ends on two spaced-apart profile rails 10, which define a crane track of the crane 1 and each have a c-shaped cross-section. The support 2 is suspended by means of crane running gears 7, 8, which are attached in the region of the longitudinal ends of the support 2 and each of which is partially, in particular with its wheels (not shown), received in an interior space enclosed by the assigned profile rail 10, and is connected to the support 2 through an opening delimited by the arms of the respective profile rail 10. The profile rails 10 are likewise suspended on a superstructure by means of rail suspensions (not shown) and are arranged, by way of example, in parallel to one another.

The longitudinal extension of the profile rails 10, which form the crane track and associated running surfaces for the crane running gears 7, 8 or the wheels thereof, defines a crane travel direction Y of the crane 1, which extends horizontally and in this case at right angles to the trolley travel direction X.

The lower chord 4 of the support 2 is formed by a profile rail 10 having the aforementioned features of the crane-track profile rails 10, so that the crane 1 has a total of three identical profile rails 10. By way of example, FIG. 1 also shows that the lower chord 4 is formed by two chord segments 4*b* or correspondingly long profile-rail segments, which meet one another in the region of their butt joint 11 and are flushly secured to one another in the longitudinal direction of the support 2. In this way, the upper chord 3 can also be designed to be multi-part and can be formed by a plurality of chord segments. In the present example, the lower chord 4 is longer than the upper chord 3 and the longitudinal extension of the bracing formed by the braces 5. In this case, the lower chord 4 projects in the direction of its longitudinal ends beyond the bracing and the upper chord 4 on both sides. The crane running gears 7, 8 are arranged on and secured to the longitudinal ends, which are thus free of upper chord and of bracing.

Figure 1:
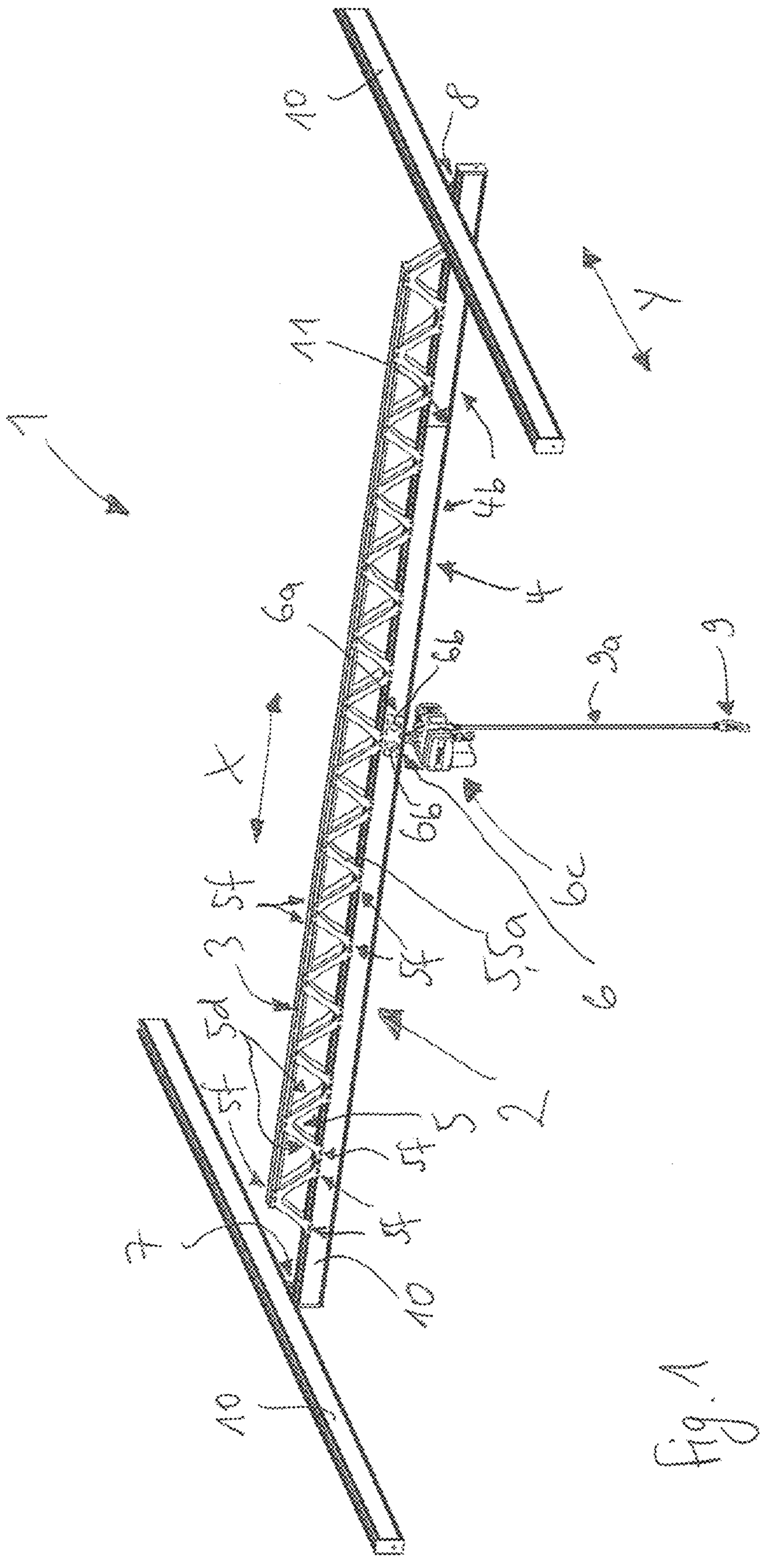
FIG. 1 shows a perspective view of a crane with a support according to the invention in a first embodiment.

In addition, FIG. 1 shows a control switch 9, which is connected in a signal-transmitting manner via a control line 9*a* to the trolley 6 and in particular to the hoist 6*c* for the purpose of controlling at least the lifting motor of the hoist 6*c*.

Figure 2A:
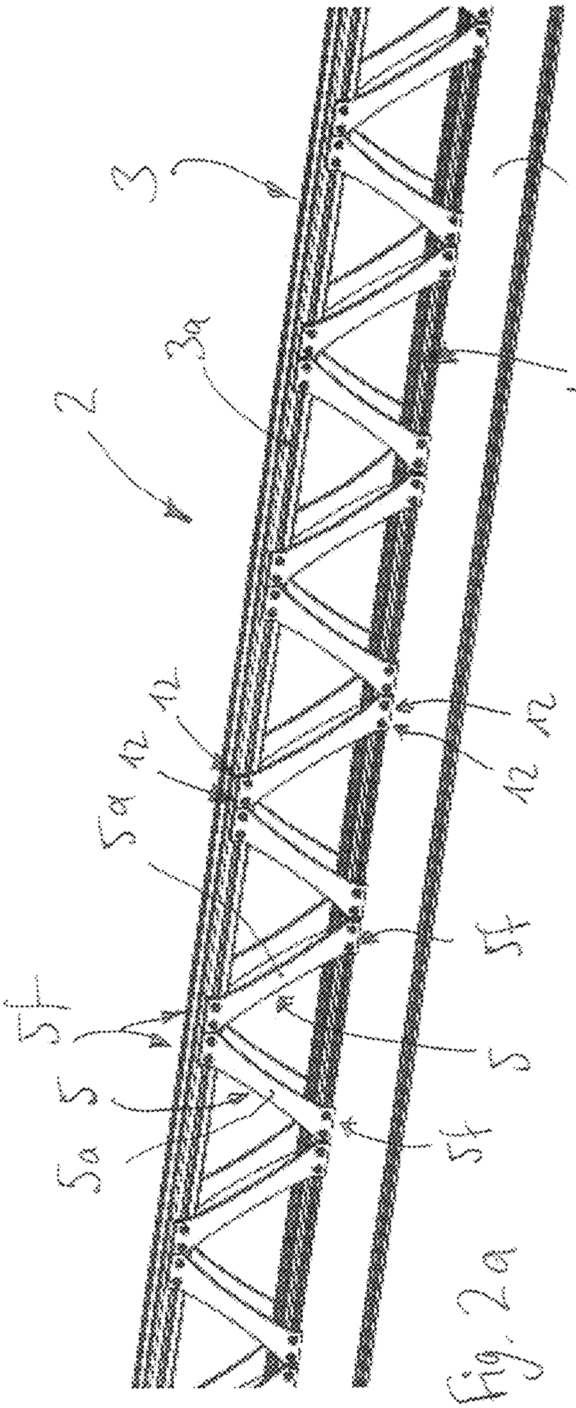
FIGS. 2*a*, 2*b* show a first perspective and a first lateral detail view of the support of FIG. 1, FIGS. 3*a*, 3*b* show a second perspective and a second lateral view of the support of FIG. 1, FIGS. 4*a*, 4*b* show a perspective and a lateral detail view of a second exemplary embodiment of a support according to the invention for the crane according to FIG. 1, FIGS. 5*a*, 5*b* show a perspective and a lateral detail view of a third embodiment of a support according to the invention for the crane according to FIG. 1, FIGS. 6*a*, 6*b* show a perspective and a lateral view of a fourth embodiment of a support according to the invention for the crane according to FIG. 1.
Figure 2B:
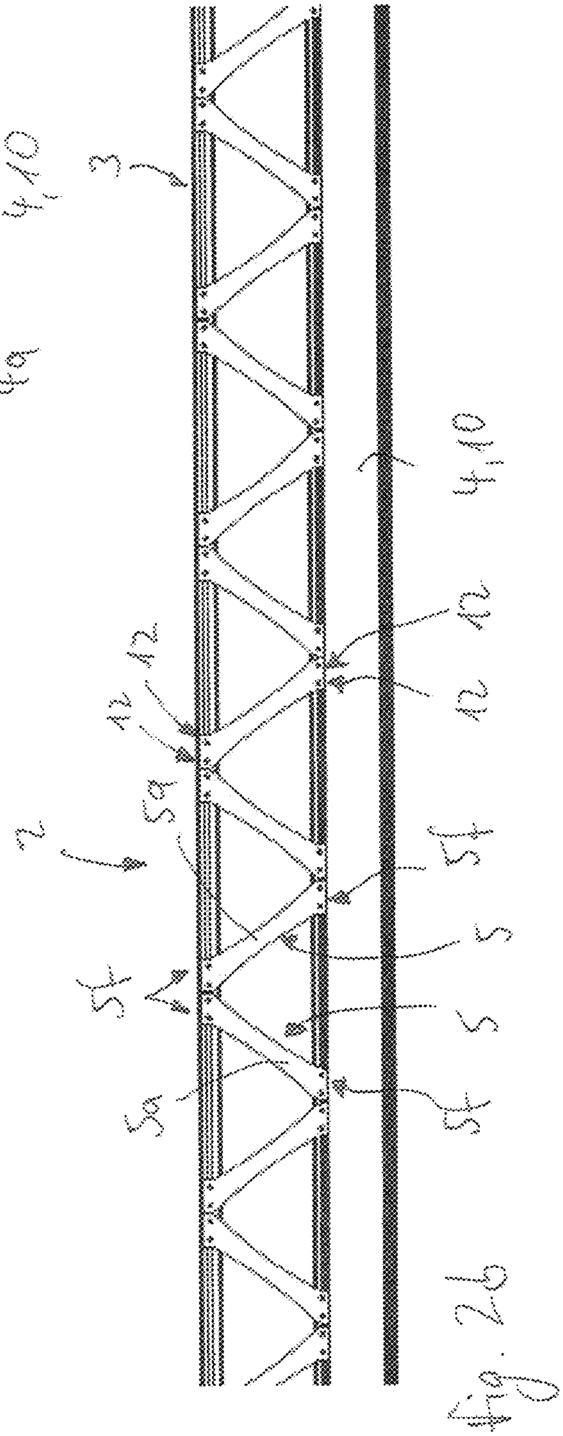
Figure 3A:
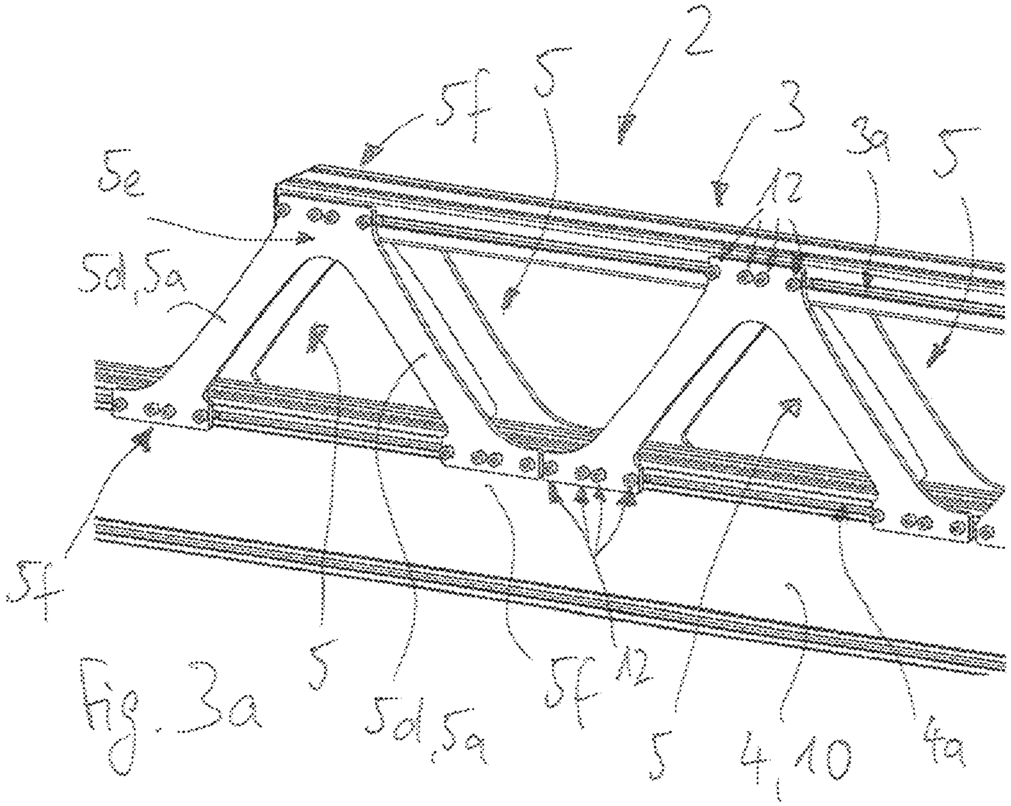
Figure 3B:
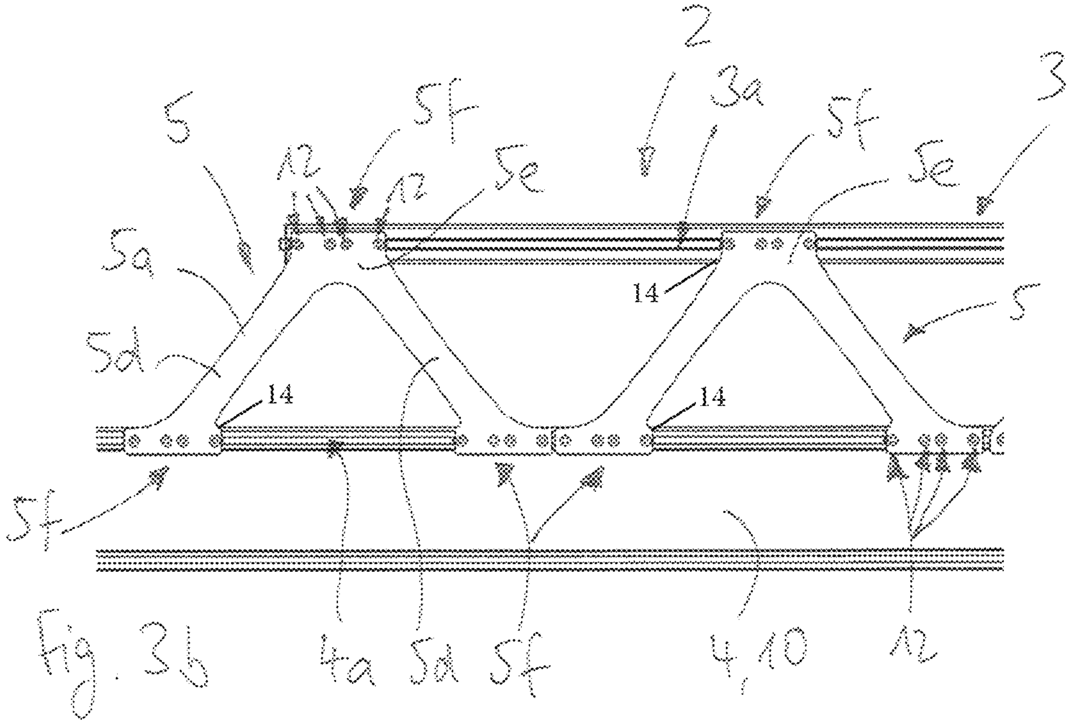

FIG. 1 furthermore shows an arrangement in pairs of braces 5 along the longitudinal axis of the support 2, wherein the braces 5 of the brace pairs are arranged such that a rising and a falling inclination of the braces 5 or of the associated arms 5*d* (see also FIGS. 3*a* and 3*b*) alternately result along each longitudinal side. This results in a bracing in the form of inverted "Vs" arranged in a row on each longitudinal side of the support 2. The braces 5 are each releasably secured with at least one of their securing ends 5*f* (see, for example, FIGS. 2*a* and 2*b* along with 3*a* and 3*b*) to the upper chord 3 and with a further one of their securing ends 5*f* to the lower chord 4. The releasable securing is carried out by way of example via a screw connection on each securing end 5*f*. For this purpose, provision is made for a receiving groove 3*a*, 4*a* (see, for example, FIGS. 2*a* to 3*b*) with a c-shaped cross-section to be provided on the outside of the respective longitudinal side of the upper chord 3 and of the lower chord 4, in order to be able to receive therein at least one element per securing end 5*f* for producing the releasable securing of the braces 5, for example the nut(s) of the respective screw connection. A friction-increasing contact surface 14 may be provided between at least one of the braces 5 and the upper chord 3 and/or the lower chord 4, as shown in FIG. 3*b* and discussed above.

In the exemplary embodiment shown in FIG. 1, all braces 5 of the support 2 are designed to be completely chamfer-free in the above sense. The main surfaces 5*a* of the braces 5 therefore face away from the support longitudinally and horizontally between the upper chord and the lower chord and extend in particular vertically to the running surface and crane track. Between the securing ends 5*f*, the longitudinal edges of the braces 5 have a biconcave profile and the main surface 5*a* thus has a profile which narrows on both sides, as a result of which the braces 5 or arms 5*d* initially taper along their longitudinal extension starting from the respective securing end 5*f* and subsequently widen again in the direction of the opposite securing end 5*f*.

With regard to the number of their securing ends 5*f*, the braces 5 of the support 2 of FIG. 1 differ, however, so that a total of two variants of the braces 5 are installed on the support 2. The design of the first variant of the braces 5 of FIG. 1 is also shown in the detail views of FIGS. 2*a* and 2*b*. The design of the second variant of the braces 5 of FIG. 1 is also shown in the detail views of FIGS. 3*a* and 3*b*.

While the braces 5 according to the first variant each have only two securing ends 5*f* in the form of their opposite longitudinal ends, one of which is secured to the upper chord 3 and one of which is secured to the lower chord 4 in each case, the braces 5 according to the second variant are two-arm and thus multi-arm. The two arms 5*d* formed per brace 5 as a result converge in a connection region 5*e* of the brace 5 on the upper chord 3, wherein the connection region 5*e* simultaneously forms one of the total of three securing ends 5*f* of this variant. Accordingly, the arms 5*d* or their securing ends 5*f* arranged on the lower chord 4 are spaced apart from one another in the longitudinal direction of the support 2. This results in a bracing in the form of an inverted "V" on the respective longitudinal side of the support 2 similarly to the arrangement of two braces 5 with only two securing ends 5*f* each. Due to the symmetry, the two-arm braces 5 also have, on their arms 5*d*, in particular similarly designed main surfaces 5*a*.

A further difference between the two variants is that, with the first variant, each securing end 5*f* is secured to the upper chord 3 or lower chord 4 by a screw connection comprising two screws 12. In the second variant, each of the three securing ends 5*f* is instead secured to the upper chord 3 or lower chord 4 by a screw connection comprising four screws 12.

As can be seen in FIGS. 1, two brace pairs of two-arm braces 5 and therebetween brace pairs, the braces 5 of which have only two securing ends 5*f*, are arranged on each of the opposite longitudinal ends of the bracing of the support 2. The detailed views of FIGS. 3*a* and 3*b* show the two-arm braces 5 of one of the two longitudinal ends. Other combinations and arrangements of the described brace variants are also conceivable.

Figure 4A:
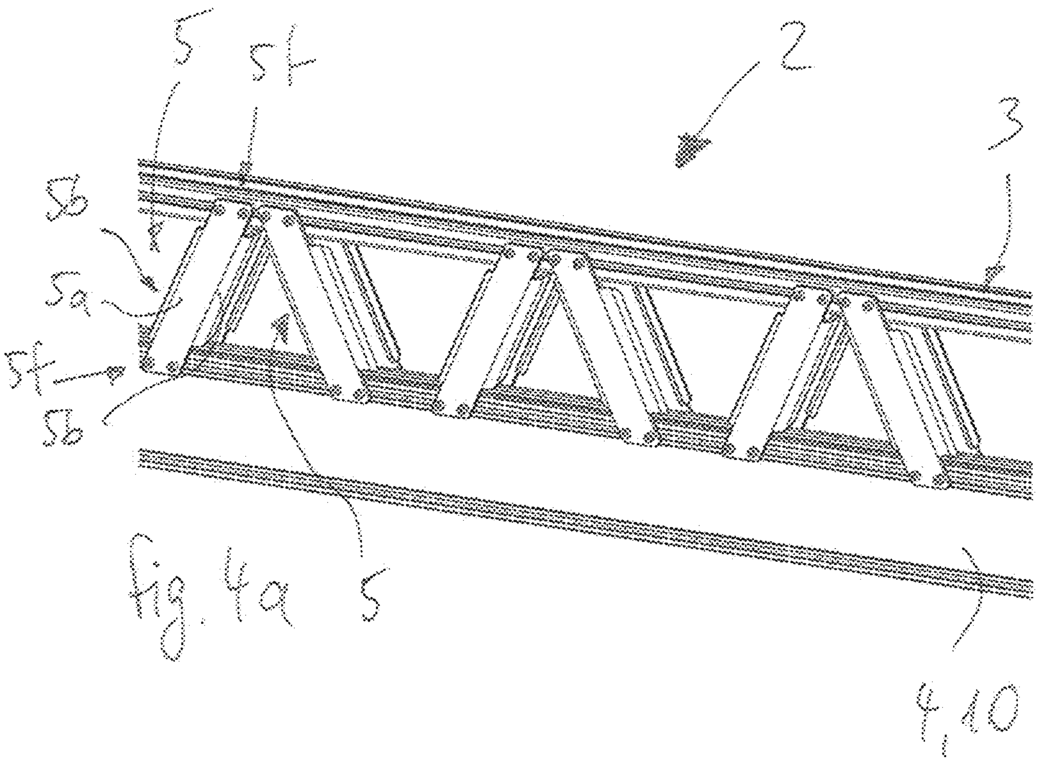
Figure 4B:
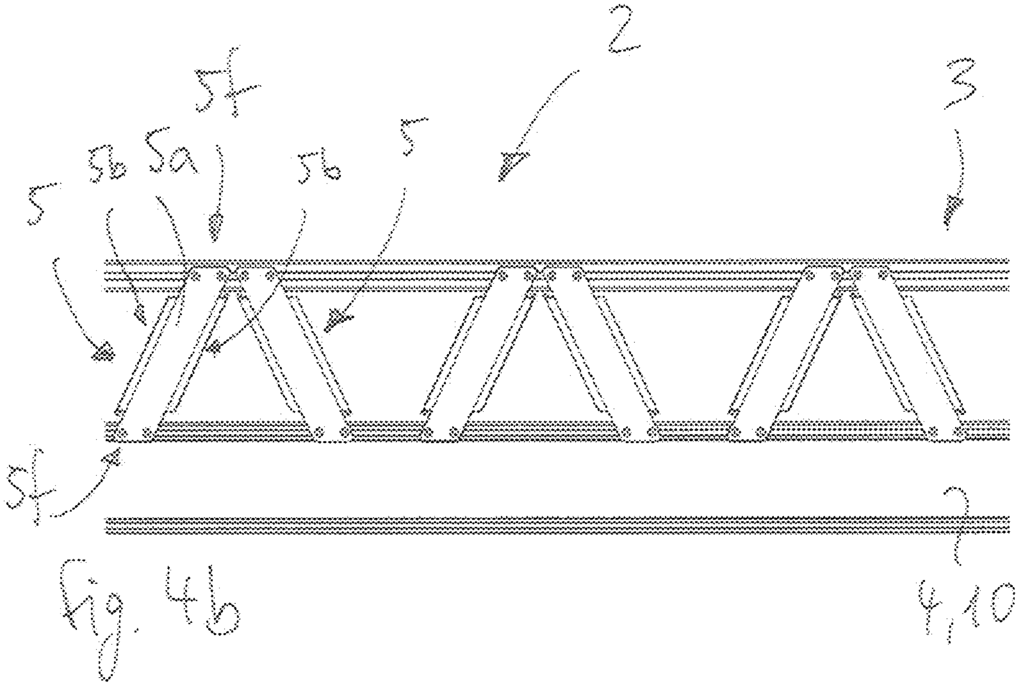

FIGS. 4*a* and 4*b* show detail views of a second embodiment of an alternative support 2 according to the invention for the crane 1 according to FIG. 1. In this second embodiment, the braces 5 as well as the variant shown in FIGS. 2*a* and 2*b* have only two securing ends 5*f* in each case. An essential special feature of the braces 5 according to the second embodiment is that they have, on each of their longitudinal sides, a secondary surface 5*b* adjoining the main surface 5*a* for increasing the buckling stiffness. The secondary surfaces 5*b* each extend transversely to the main surface 5*a* inward in the direction of the longitudinal axis of the support 2. As a result, the braces have a U-shaped cross-section. With respect to the securing of the braces 5 to the upper chord 3 and the lower chord 4, the orientation of the main surfaces 5*a* and the overall resulting bracing in the form of inverted "Vs" arranged in a row, the above descriptions also apply to this embodiment.

Figure 5A:
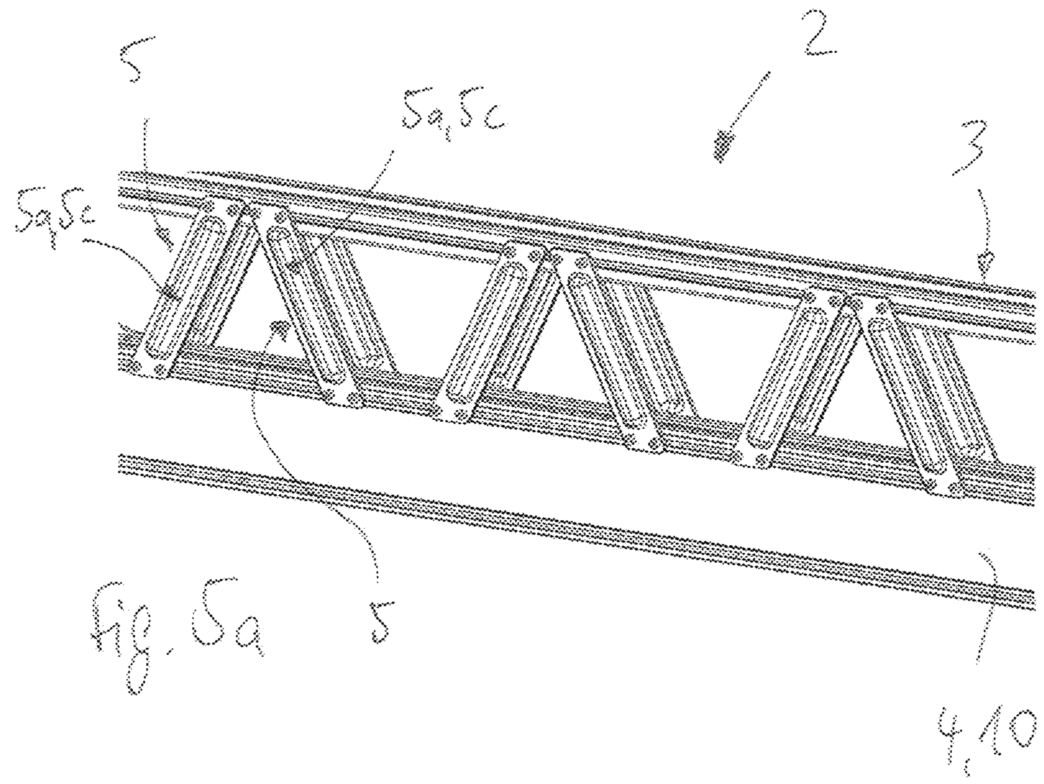
Figure 5B:
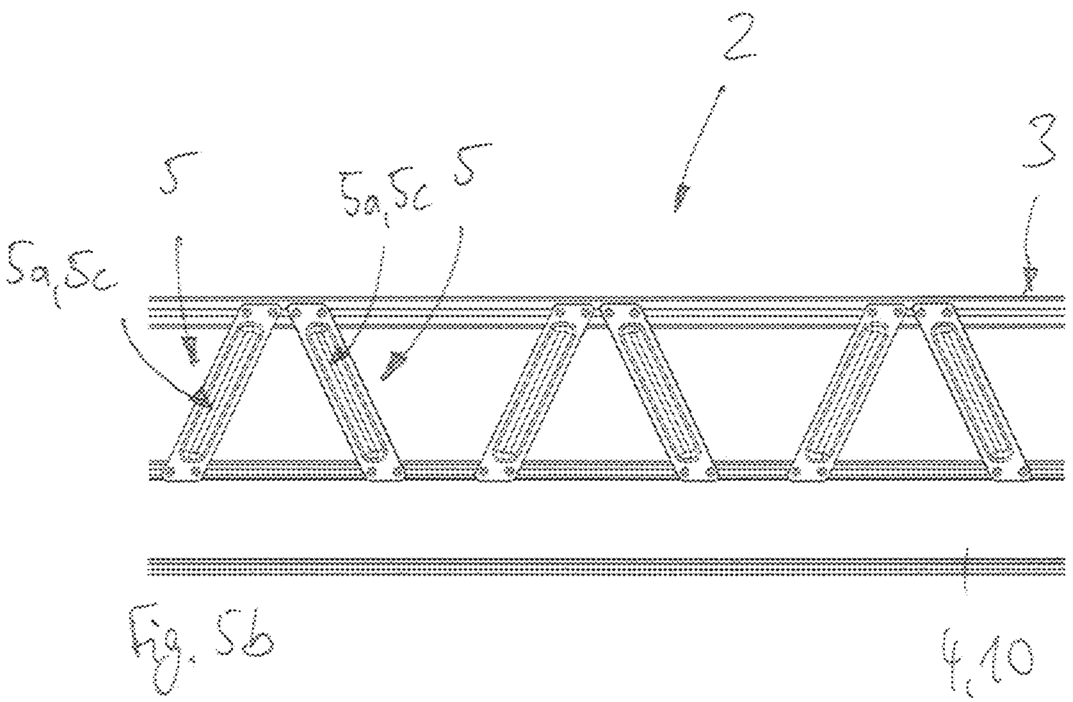

FIGS. 5*a* and 5*b* show detail views of a third embodiment of an alternative support 2 according to the invention for the crane 1 according to FIG. 1. The braces 5 of this embodiment substantially differ from the braces 5 of the second embodiment according to FIGS. 4*a* and 4*b* in that all braces 5 of the support 2 are designed to be completely chamfer-free in the above sense, that is to say that in particular no secondary surfaces 5*b* are provided on their longitudinal sides. In order to increase the buckling stiffness, the main surface 5*a* of each brace 5 has a bead 5*c* instead. In this case, the bead 5*c* formed as a depression in the respective main surface 5*a* is arranged between the longitudinal sides of the brace 5, such that a planar portion of the main surface 5*a* extending in parallel to the longitudinal axis of the support 2 is located between the bead 5*c* and the two edges delimiting the longitudinal sides. In addition, the longitudinal extension of the bead 5*c* extends in parallel to and in a centered manner with respect to the central longitudinal axis of the main surface 5*a* of the respective brace 5. The depression of the main surface 5*a* provided for forming the bead 5*c* is directed outward by way of example.

Figure 6A:
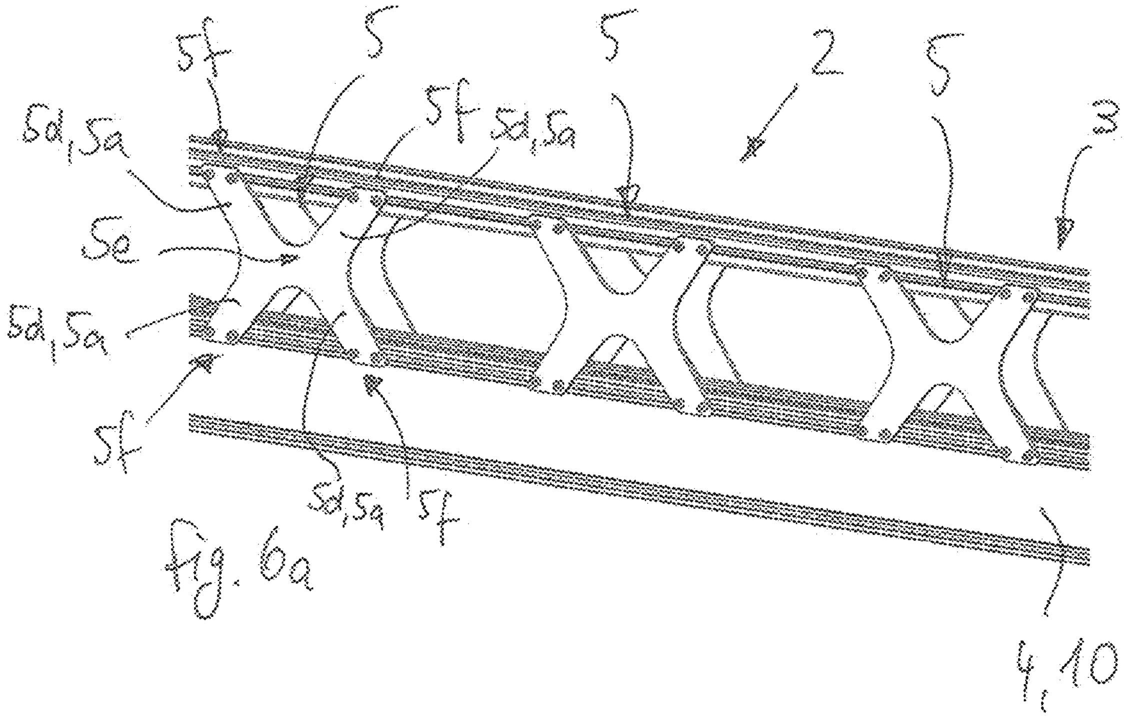
Figure 6B:
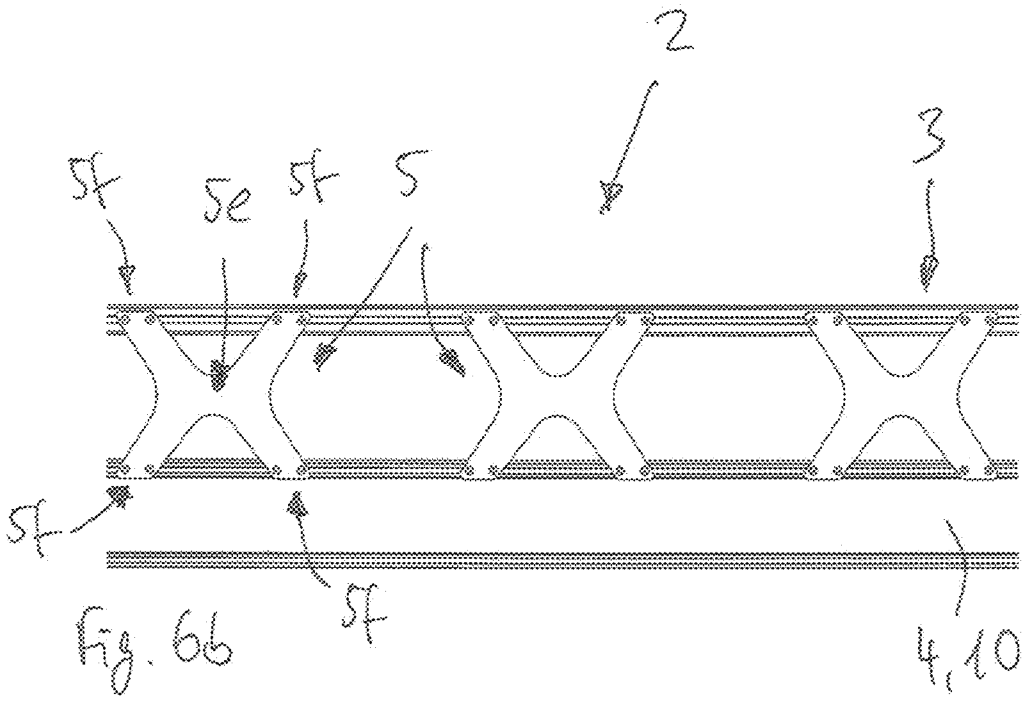

FIGS. 6*a* and 6*b* show detail views of a fourth embodiment of an alternative support 2 according to the invention for the crane 1 according to FIG. 1. The braces 5 of this embodiment substantially differ from the braces 5 of the second and third embodiment according to FIGS. 4*a* to 5*b* in that all braces 5 of the support 2 are designed to be completely chamfer-free in the above sense, i.e., no secondary surfaces 5*b* are provided, and no beads 5*c* are provided either. Another difference is that the braces 5 according to the fourth embodiment are designed to be multi-arm. In contrast to the two-arm braces 5 of FIGS. 1, 3*a* and 3*b*, the braces 5 of the fourth embodiment are however designed to be four-arm. The four arms 5*d* of each brace 5 converge in a connection region 5*e*, which, however, unlike in the two-arm variant, is arranged not on the upper chord 3, but in the free region of the brace 5 between the upper chord 3 and the lower chord 4. This results in an x-shaped or H-shaped design of these braces 5. Due to the symmetry, the four-arm braces 5 also have, on their arms 5*d*, in particular similarly designed main surfaces 5*a*. Due to the x-shaped or H-shaped form, the four-arm braces each have four securing ends 5*f*, of which two are spaced apart from one another in the longitudinal direction of the support 2 and secured to the upper chord 3 and two are spaced apart from one another in the longitudinal direction of the support 2 and secured to the lower chord 4 in each case.

In comparison to the three-arm braces 5, fewer screws 12, in the present case two screws 12 by way of example, are provided in the fourth embodiment in each case per securing end 5*f* and associated screw connection on the upper chord 3 or lower chord 4.

LIST OF REFERENCE SIGNS

- 1 Crane
- 2 Support
- 3 Upper chord
- 3*a* Receiving groove
- 4 Lower chord
- 4*a* Receiving groove
- 4*b* Chord segment
- 5 Brace
- 5*a* Main surface

**5*b*** Secondary surface
**5*c*** Bead
**5*d*** Arm
**5*e*** Connection region
**5*f*** Securing end
6 Trolley
**6*a*** Trolley running gear
**6*b*** Wheel
**6*c*** Hoist
7 First crane running gear
8 Second crane running gear
9 Control switch
**9*a*** Control line
10 Profile rail
11 Butt joint
12 Screw
X Trolley travel direction
Y Crane travel direction

The invention claimed is:

1. A support for a trolley, comprising a running surface that is formed on the support for the trolley, an upper chord, a lower chord and braces that connect said chords together, wherein the braces are flat, and each brace has a flat main surface that faces away from the support longitudinally between the upper chord and the lower chord, wherein two of the braces form a brace pair in each case and are arranged next to one another as viewed in the direction of the longitudinal axis of the support, wherein the flat braces are releasably secured to the upper chord and/or to the lower chord, and wherein the running surface is arranged in an interior space defined by the lower chord for receiving an internally running trolley running gear of the trolley, and wherein the running surface comprises a continuous surface for supporting the trolley running gear.

2. The support according to claim 1, wherein a receiving groove having a c-shaped cross-section is provided on the upper chord and/or lower chord in order to be able to receive therein an element for producing the releasable securing of the braces.

3. The support according to claim 2, wherein the receiving groove is provided on the outside of a longitudinal side of the respective upper chord and/or lower chord.

4. The support according to claim 1, wherein at least one of the braces is chamfer-free at least on longitudinal sides of the at least one of the braces.

5. The support according to claim 1, wherein at least one of the braces has, on at least one of its longitudinal sides, a secondary surface adjoining the main surface and extending transversely thereto.

6. The support according to claim 1, wherein the main surface of at least one of the braces has a bead.

7. The support according to claim 1, wherein at least one of the braces comprises a multi-arm brace.

8. The support according to claim 7, wherein the at least one multi-arm brace has either two-arms or four-arms.

9. The support according to claim 8, wherein each arm of the flat main surfaces of the at least one multi-arm brace is similar.

10. The support according to claim 1, wherein at least one friction-increasing contact surface is provided between at least one of the braces and the upper chord and/or between at least one of the braces and the lower chord.

11. The support according to claim 1, wherein the lower chord has a c-shaped cross-section defined by arms of the lower chord delimiting an opening of the interior space, and wherein the running surface is arranged on the arms.

12. An overhead transport device comprising a support according to claim 1, and further comprising a trolley that can be moved along the support on the running surface.

13. The overhead transport device of claim 12, wherein the transport device comprises a suspension track or a crane.

14. The overhead transport device of claim 13, wherein the transport device comprising a crane comprises a suspension crane.

15. The support according to claim 1, wherein the brace pairs are arranged on the outside of opposite longitudinal sides of the support.

16. The support according to claim 1, further comprising a trolley having a trolley running gear, and wherein the trolley running gear is mounted to the lower chord for movement along the running surface.

* * * * *